(12) United States Patent
Yang et al.

(10) Patent No.: US 11,463,419 B2
(45) Date of Patent: *Oct. 4, 2022

(54) FILE SECURITY METHOD AND APPARATUS FOR SAME

(71) Applicant: FACECON CO., LTD., Seoul (KR)

(72) Inventors: Giho Yang, Seoul (KR); Jae-Yeob Hwang, Goyang-si (KR)

(73) Assignee: Facecon Co., Ltd., Seoul (KR)

( * ) Notice: Subject to any disclaimer, the term of this patent is extended or adjusted under 35 U.S.C. 154(b) by 403 days.

This patent is subject to a terminal disclaimer.

(21) Appl. No.: 16/711,104

(22) Filed: Dec. 11, 2019

(65) Prior Publication Data

US 2020/0120073 A1    Apr. 16, 2020

Related U.S. Application Data

(63) Continuation of application No. 14/785,300, filed as application No. PCT/KR2014/003437 on Apr. 18, 2014, now Pat. No. 10,541,980.

(30) Foreign Application Priority Data

Apr. 18, 2013 (KR) .................. 10-2013-0043234
Apr. 18, 2014 (KR) .................. 10-2014-0046873

(51) Int. Cl.
*H04L 9/40* (2022.01)
*G06F 16/17* (2019.01)
*G06F 21/62* (2013.01)

(52) U.S. Cl.
CPC .......... *H04L 63/0428* (2013.01); *G06F 16/17* (2019.01); *G06F 21/62* (2013.01); *H04L 63/061* (2013.01)

(58) Field of Classification Search
CPC ... H04L 63/0428; H04L 63/061; G06F 16/17; G06F 9/335
USPC .......................................... 713/171
See application file for complete search history.

(56) References Cited

U.S. PATENT DOCUMENTS

| 10,541,980 B2* | 1/2020 | Yang .................. H04L 63/061 |
| 10,574,442 B2* | 2/2020 | Amiri .................. H04L 9/0822 |
| 10,979,410 B1* | 4/2021 | Byrd .................. H04L 63/0428 |
| 2005/0086497 A1* | 4/2005 | Nakayama ............ G06F 21/32 713/185 |
| 2007/0156710 A1 | 7/2007 | Kern |
| 2008/0080717 A1 | 4/2008 | Anzai |
| 2008/0219449 A1 | 9/2008 | Ball |
| 2009/0202080 A1 | 8/2009 | Mizuno |

(Continued)

FOREIGN PATENT DOCUMENTS

| JP | 11-175475 A | 7/1999 |
| JP | 2009-75688 A | 4/2009 |

(Continued)

*Primary Examiner* — Teshome Hailu
(74) *Attorney, Agent, or Firm* — Knobbe Martens Olson & Bear LLP

(57) ABSTRACT

Disclosed is a file security method for reinforcing file security. The method may include: by a first communication device, detecting an access to a file stored in a virtual drive; by the first communication device, requesting a decryption key of the file to a second communication device and receiving the decryption key; and by the first communication device, decrypting the access-detected file by using the decryption key.

19 Claims, 9 Drawing Sheets

(56) References Cited

U.S. PATENT DOCUMENTS

| | | |
|---|---|---|
| 2011/0276493 A1 | 11/2011 | Graham, III |
| 2012/0297188 A1 | 11/2012 | van der Linden |
| 2014/0095868 A1 | 4/2014 | Korthny |
| 2018/0212932 A1* | 7/2018 | Novak ............... H04L 9/14 |
| 2018/0212940 A1* | 7/2018 | Novak ............ H04L 63/101 |
| 2019/0116167 A1* | 4/2019 | Johnson ......... H04L 63/0876 |
| 2020/0120073 A1* | 4/2020 | Yang ............. H04L 63/061 |

FOREIGN PATENT DOCUMENTS

| | | |
|---|---|---|
| JP | 2009-193125 A | 8/2009 |
| JP | 2012-256253 A | 12/2012 |
| KR | 2001-0093472 A | 10/2001 |
| KR | 10-2009-0080412 | 7/2009 |
| KR | 10-2011-0016227 | 2/2011 |
| WO | 2012/157926 A2 | 11/2012 |
| WO | 2012/162128 A1 | 11/2012 |
| WO | 2012/121497 A2 | 9/2013 |

* cited by examiner

FILE SECURITY METHOD AND APPARATUS FOR SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to a file security technique, and more particularly, to a file security method for encrypting or decrypting a file in association with a plurality of devices and an apparatus for the same.

The present application claims the benefit of Korean Patent Application No. 10-2013-0043234 filed on Apr. 18, 2013, and Korean Patent Application No. 10-2014-0046873 filed on Apr. 18, 2014 with the Korean Intellectual Property Office, the disclosure of which is incorporated herein by reference in its entirety.

BACKGROUND ART

In order to safely store a file of a computer, users input an encryption key to encrypt the file and then store the encrypted file in a computer. Also, users input a decryption key to decrypt the encrypted file and execute the file. Korean Unexamined Patent Publication No. 10-2001-0093472 discloses an apparatus for encrypting and decrypting a content file.

However, in an existing file encrypting method, when a file frequently used is encrypted and stored, a decryption key of the file is demanded to a user whenever the user accesses the encrypted file, which causes inconvenience to the user. For this reason, the user sets an encryption key for encrypting a file with a simple code, and if the encrypted file outflows, the encrypted file may be easily decrypted by other persons due to such a simple encryption key.

DISCLOSURE

Technical Problem

The present disclosure is designed to solve the problems of the related art, and therefore the present disclosure is directed to providing a file security method which may enhance file security and improve user convenience, and an apparatus for the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In a first aspect of the present disclosure, there is provided a file security method for reinforcing file security, which includes: by a first communication device, detecting an access to a file stored in a virtual drive; by the first communication device, requesting a decryption key of the file to a second communication device and receiving the decryption key; and by the first communication device, decrypting the access-detected file by using the decryption key.

In a second aspect of the present disclosure, there is provided a communication device, which reinforces security for a file stored in a virtual drive, which includes a decryption module configured to request a decryption key of the file to another designated communication device and receive the decryption key, when an access to the file stored in the virtual drive is detected, and to decrypt the access-detected file by using the decryption key.

In a third aspect of the present disclosure, there is provided a communication device, which reinforces security for a file stored in a virtual drive, which includes: a storage module configured to store an encryption key and a decryption key which are mapped with file identification information; and a key providing module configured to, when an encryption key or a decryption key for a file stored in the virtual drive is requested by another communication device, extract an encryption key or a decryption key mapped with the file identification information from the storage module and transmit the mapped encryption or decryption key to the another communication device.

In a fourth aspect of the present disclosure, there is provided a file security method for reinforcing file security, which includes: by a first communication device, detecting an access to a file stored in a virtual drive; by the first communication device, requesting a security code of the file to a second communication device and receiving the security code; by the first communication device, receiving a decryption key of the file, at which a storage address is set, from a key storage server on the basis of the security code; and by the first communication device, decrypting the access-detected file by using the received decryption key.

In a fifth aspect of the present disclosure, there is provided a communication device, which reinforces security for a file stored in a virtual drive, which includes: a decryption module configured to, when an access to the file stored in the virtual drive is detected, request a security code of the file to another designated communication device and receive the security code, to receive a decryption key of the file whose storage address is set on the basis of the security code, and to decrypt the access-detected file by using the decryption key.

In a sixth aspect of the present disclosure, there is provided a communication device, which reinforces security for a file stored in a virtual drive, which includes: a storage module configured to store a security code for each file; and a security code management module configured to receive a request for generating a key for a file stored in the virtual drive from another communication device which accesses the virtual drive, to generate a security code for the file and store the generated security code in the storage module, to generate an encryption key and a decryption key for the file, and to store the generated encryption and decryption keys in a storage area of a key storage server which is set on the basis of the security code.

Advantageous Effects

The present disclosure has an advantage of reinforcing security of user data since a file is encrypted and stored in association with communication devices and the encrypted file is decrypted in association with communication devices.

In addition, in the present disclosure, since a file is not normally decrypted just with data stored in one device, even though data stored in a specific device is stolen, the file stored in a virtual drive cannot be decrypted by other persons, and thus the file stored in the virtual drive may be effectively protected against hacking.

Further, in the present disclosure, if a first communication device and a second communication device move away from the same place, an access of the user to the virtual drive is blocked, which fundamentally prevents an illegal user from accessing the virtual drive.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

The foregoing objects, features, and advantages will become apparent from the following detailed description with reference to the accompanying drawings, and accordingly, those skilled in the art will be able to easily practice the technical aspects of the present disclosure. Also, in the description of the present disclosure, when it is deemed that certain detailed description of known technology related to the present disclosure may unnecessarily obscure the essence of the disclosure, its detailed description is omitted herein. Hereinafter, an exemplary embodiment of the present disclosure is described in detail with reference to the accompanying drawings.

Figure 1:
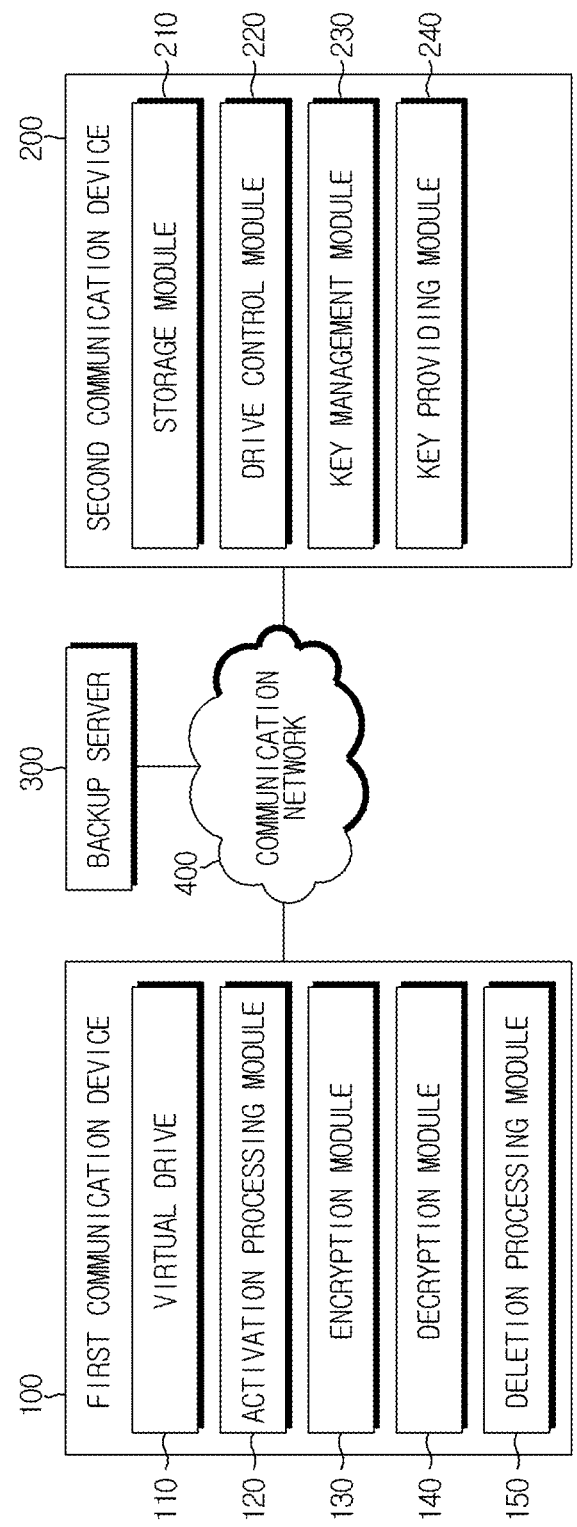
FIG. 1 is a diagram a file security system according to an embodiment of the present disclosure.

FIG. 1 is a diagram a file security system according to an embodiment of the present disclosure.

As shown in FIG. 1, a file security system according to an embodiment of the present disclosure includes a first communication device 100, a second communication device 200 and a backup server 300. The first communication device 100, the second communication device 200 and the backup server 300 communicate with each other through a communication network 400. The communication network 400 may employ a mobile communication network, a broad band wired communication network or the like, and this is widely known in the art and not described in detail in the present disclosure. In addition, the first communication device 100 and the second communication device 200 are configured to be associated with each other in advance. In other words, according to user settings, the first communication device 100 and the second communication device 200 communicate with each other for file security. Preferably, the first communication device 100 and the second communication device 200 are possessed by the same single user.

The backup server 300 separately stores a key table which is already stored in the second communication device 200. In other words, the backup server 300 stores a key table where file identification information, an encryption key and a decryption key are mapped, for each user distinguishably. In addition, when receiving a request for restoring data from the second communication device 200, the backup server 300 certifies a user of the second communication device 200 and then, if the user certification is successful, the backup server 300 extracts a key table dedicated to the user and transmits the key table to a designated communication device. For user certification, the backup server 300 may perform user certification in association with an external user certification server (not shown), or may store user certification information of each user and perform user certification based on the stored user certification information.

The first communication device 100 is a communication device accessible to a virtual drive 110. The first communication device 100 encrypts a file by using an encryption key received from the second communication device 200 and then stores the encrypted file in the virtual drive 110, and also the first communication device 100 decrypts and executes a file stored in the virtual drive 110 by using a decryption key received from the second communication device 200. The first communication device 100 may employ any device capable of communicating with the second communication device 200 via the communication network 400, without limitation, for example a desktop computer, a notebook, a server, a mobile communication terminal or the like.

The first communication device 100 includes a virtual drive 110, an activation processing module 120, an encryption module 130, a decryption module 140 and a deletion processing module 150.

The virtual drive 110 gives a security area for storing a security-set file and is selectively activated by the control of the activation processing module 120. As shown in FIG. 1, the virtual drive 110 may be implemented at a local area of the first communication device 100. In addition, the virtual drive 110 may also be implemented outsides (for example, at a cloud server), similar to other embodiments.

The activation processing module 120 determines whether or not to activate the virtual drive 110 and whether or not to display a file stored in the virtual drive 110. In detail, the activation processing module 120 activates a menu accessible to the virtual drive 110 and displays the menu on the screen, on the basis of an instruction from the second communication device 200. In addition, the activation processing module 120 provides a list of files stored in the virtual drive 110 to the second communication device 200, exposes a file selected by the second communication device 200 on the screen to allow an access of a user, and does not expose a file not selected by the second communication device 200 on the screen, so that only a file selected by the second communication device 200 allows an access, among the files stored in the virtual drive 110. At this time, the activation processing module 120 requests certification information to the second communication device 200 and receives the certification information, and after performing certification of access authority of the user on the basis of the certification information, the activation processing module 120 may transmit the list of files stored in the virtual drive 110 to the second communication device 200 only when the certification is successful.

When a new file is stored in the virtual drive 110 or a file stored in the virtual drive 110 is modified, the encryption module 130 receives an encryption key for the corresponding file from the second communication device 200, encrypts the file by using the encryption key, and stores the encrypted file in the virtual drive 110. In particular, when a new file is stored in the virtual drive 110, the encryption module 130 requests the second communication device 200 to generate an encryption/decryption key for the file.

When a user accesses a file stored in the virtual drive 110, the decryption module 140 requests a decryption key for the file to the second communication device 200 and receives the decryption key, and decrypts the file by using the received decryption key and then executes the file.

The deletion processing module 150 monitors whether a file stored in the virtual drive 110 is deleted, and if a file is deleted, the deletion processing module 150 requests the second communication device 200 to delete the encryption/decryption key for the deleted file.

The second communication device 200 manages an encryption key and a decryption key of each file stored in the virtual drive 110, and provides an encryption key or a decryption key of the file requested by the first communication device 100 to the first communication device 100. The second communication device 200 may adopt any device capable of communicating with the first communication device 100 via the communication network 400, for example a notebook, a mobile communication terminal or the like, and preferably a smart phone is employed.

The second communication device 200 includes a storage module 210, a drive control module 220, a key management module 230 and a key providing module 240.

The storage module 210 stores a key table in which file identification information, an encryption key and a decryption key are mapped.

The drive control module 220 controls whether or not to activate the virtual drive 110. In detail, if the first communication device 100 and the second communication device 200 are located at the same place, the drive control module 220 transmits a command to activate the drive, and the virtual drive 110 is activated at the first communication device 100. Further, the drive control module 220 receives the list of files stored in the virtual drive 110 from the first communication device 100 and controls a file selected by the user from the file to be selectively exposed at the first communication device 100. In addition, if receiving a request for certification information of the user from the first communication device 100, the drive control module 220 may obtain certification information of the user and transmits the certification information to the first communication device 100. Meanwhile, if any one of the first communication device 100 and the second communication device 200 deviates from the same place, the drive control module 220 transmits a drive inactivation command to the second communication device 200 to block an access to the virtual drive at the first communication device 100.

The key management module 230 manages generation and deletion of an encryption key and a decryption key stored in the storage module 210. In other words, if receiving a request for generating an encryption/decryption key for a new file from the first communication device 100, the key management module 230 generates an encryption key and a decryption key for the new file, maps the generated encryption and decryption keys and identification information of the new file, and stores them in a key table of the storage module 210. In other words, the key management module 230 generates an encryption key used for encrypting the new file and a decryption key used for normally decrypting the file encrypted by the encryption key, maps the generated encryption and decryption keys and identification information of the new file, and records them in a key management table of the storage module 210. At this time, the key management module 230 may generate the encryption key and the decryption key according to a predetermined algorithm or may receive an encryption key and a decryption key for the new file from the user.

Meanwhile, the key management module 230 may generate an encryption/decryption key used for encrypting or decrypting a specific file, and in this case, the encryption/decryption key mapped with the file identification information is recorded at the key table of the storage module 210. In other words, the key management module 230 does not separately generate an encryption key and a decryption key but generates the encryption/decryption key which allows symmetric key encryption/decryption using a single encryption/decryption key, and the generated encryption/decryption key may be mapped with corresponding file identification information and stored in the key table of the storage module 210.

In addition, if receiving an encryption/decryption key deletion request message containing the file identification information from the first communication device 100, the key management module 230 deletes the file identification information as well as the encryption key and the decryption key mapped with the file identification information from the key table of the storage module 210. Meanwhile, when a decryption key and an encryption key are recorded in the key table of the storage module 210 or an encryption key and a decryption key are deleted from the key table, namely when the key table is updated, the key management module 230 transmits a changed item of the updated key table to the backup server 300 to back up the key table of the storage module 210 to the backup server 300. In addition, the key management module 230 may also restore the key table by accessing the backup server 300, performing user certification, and then receiving the key table stored in the backup server 300.

The key providing module 240 provides an encryption key or a decryption key to the first communication device 100. In addition, if receiving an encryption or decryption key request message containing file identification information from the first communication device 100, the key providing module 240 extracts an encryption key or a decryption key mapped with the file identification information from the key table of the storage module 210 and transmits the key to the first communication device 100. In addition, if the key management module 230 generates an encryption key and a decryption key for a new file and records the key in the key table of the storage module 210, the key providing module 240 transmits the encryption key for the new file to the first communication device 100.

Figure 2:
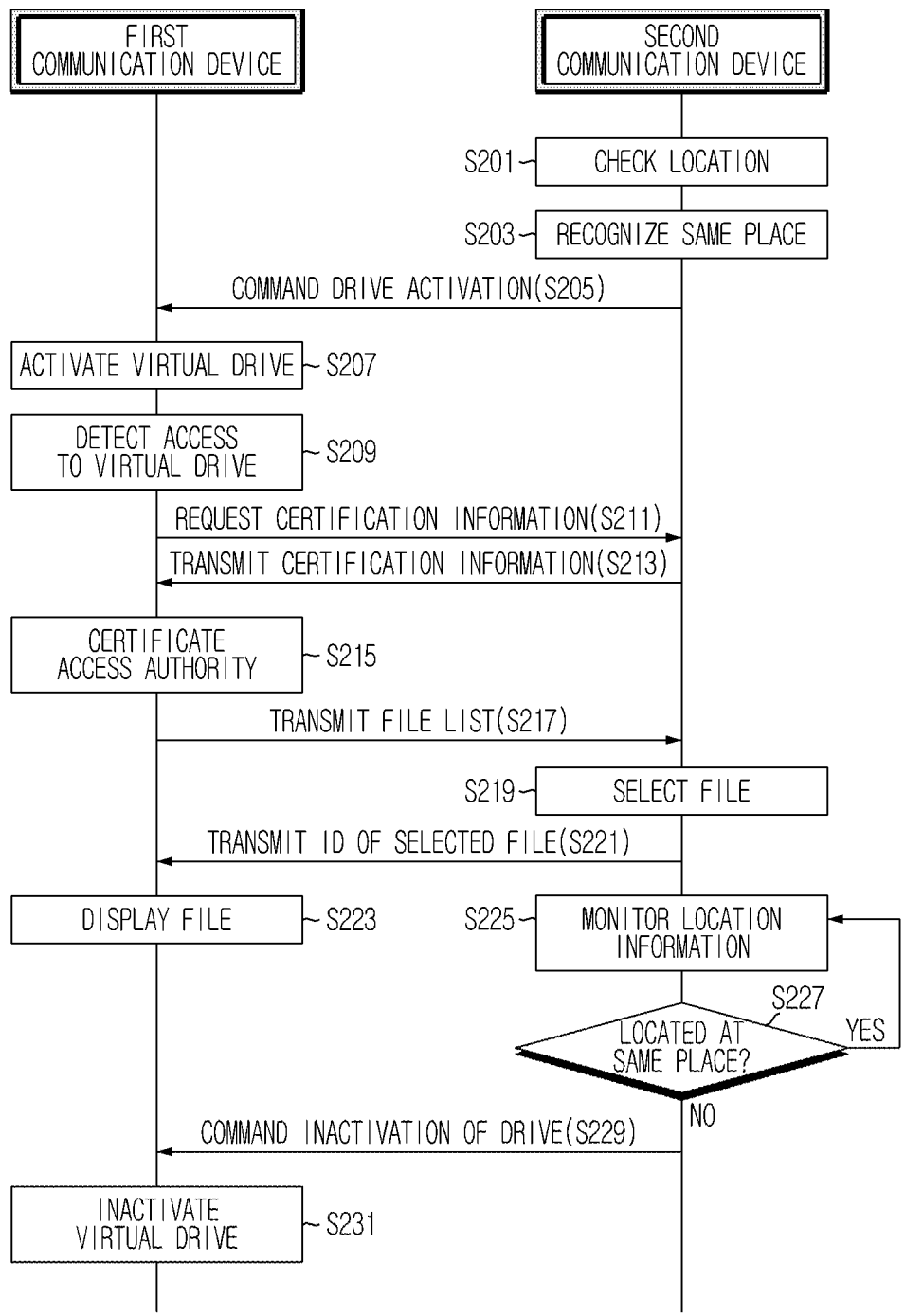
FIG. 2 is a flowchart for illustrating a method for controlling an access to a virtual drive by the file security system according to an embodiment of the present disclosure.

FIG. 2 is a flowchart for illustrating a method for controlling an access to a virtual drive by the file security system according to an embodiment of the present disclosure.

Referring to FIG. 2, the drive control module 220 of the second communication device 200 periodically checks its location and a location of the first communication device 100 (S201). At this time, if the first communication device 100 is a stationary device incapable of mobile communication, the drive control module 220 may store location information of the first communication device 100 in advance to check a location of the first communication device 100. In addition, if the first communication device 100 is capable of mobile communication, the drive control module 220 may check location information of the first communication device 100 by receiving location information (for example, GPS coordinate information or administrative address information) from the first communication device 100. Further, the drive control module 220 may obtain a GPS coordinate by using a GPS receiver loaded in the second communication device 200 and check a location of the second communication device 200 on the basis of the GPS coordinate. In addition, the drive control module 220 may check location information of the second communication device 200 by recognizing a small wireless base station (for example, an access point) capable of local wireless communication with the second communication device 200, transmitting identification information of the small wireless base station to an external location checking server (not shown), and receiving location information corresponding to identification information of the small wireless base station from the location checking server.

Next, the drive control module 220 compares location information of the first communication device 100 with location information of the second communication device 200 to determine whether the first communication device 100 and the second communication device 200 are located at the same place. At this time, the drive control module 220 checks whether the first communication device 100 and the second communication device 200 are located within the same administrative district or whether a distance between the first communication device 100 and the second communication device 200 is within a threshold distance (for example, 100 m) to determine whether the first communication device 100 and the second communication device 200 are located at the same place. Further, when the first communication device 100 and the second communication device 200 respectively access small wireless base stations, the drive control module 220 checks whether the accessed small wireless base stations are identical to each other to determine whether the first communication device 100 and the second communication device 200 are located at the same place.

If the first communication device 100 and the second communication device 200 are determined to be located at the same place (S203), the drive control module 220 transmits a drive activation command to the first communication device 100 (S205).

If so, the activation processing module 120 of the first communication device 100 exposes a menu or icon accessible to the virtual drive to activate the virtual drive (S207). Next, the activation processing module 120 monitors whether a user accesses the virtual drive to detect whether the user accesses the virtual drive (S209). At this time, if the icon or menu accessible to the virtual drive is clicked by the user, the activation processing module 120 detects that the user accesses the virtual drive. Subsequently, the activation processing module 120 requests certification information to the second communication device 200 (S211).

If so, the drive control module 220 of the second communication device 200 obtains the certification information and transmits the certification information to the first communication device 100 (S213). At this time, the drive control module 220 may output an input window on the screen of the second communication device 200 and receive certification information from the user through the input window, or may extract certification information of the user stored in the second communication device 200 in advance and transmit the certification information to the first communication device 100.

Subsequently, the activation processing module 120 of the first communication device 100 checks whether the certification information received from the second communication device 200 is identical to the certification information stored in the first communication device 100 to certificate virtual drive access authority of the user (S215). Next, if the access authority is successfully certified, the activation processing module 120 transmits a list of files stored in the virtual drive to the second communication device 200 (S217).

Then, the drive control module 220 of the second communication device 200 outputs the file list on the screen. Subsequently, if a user selects at least one file in the output file list, the drive control module 220 transmits identification information of each selected file to the first communication device 100 (S219, S221).

Next, the activation processing module 120 of the first communication device 100 displays file information (namely, a file name, a file icon, a file size or the like) corresponding to the file identification information received from the second communication device 200 on a search window or a background screen (S223). Accordingly, the user may access a selected file at the second communication device 200, among the files stored in the virtual drive 110.

If the file stored in the virtual drive 110 is exposed at the first communication device 100 as described above, the drive control module 220 continuously monitors location information of the second communication device 200 (S225). Preferably, if the first communication device 100 is a communication terminal capable of mobile communication, the drive control module 220 may continuously receive location information from the first communication device 100 to continuously monitor location information of the first communication device 100.

Next, the drive control module 220 determines whether the first communication device 100 and the second communication device 200 are continuously located at the same place on the basis of the monitored location information (S227), and then, if it is determined that they are located at the same place, Step S225 is performed again.

Meanwhile, if it is determined that the first communication device 100 and the second communication device 200 are not located at the same place, the drive control module 220 transmits a drive inactivation command to the first communication device 100 as a determination result of Step S227 (S229).

If so, the activation processing module 120 of the first communication device 100 inactivates the activated virtual drive 110 to block an access of the user to the virtual drive (S231). In other words, if the drive inactivation command is received from the second communication device 200, the activation processing module 120 inactivates the activated virtual drive 110, and also removes the file of the virtual drive 110 displayed on the search window or the like from the search window, thereby blocking an access of the user to the virtual drive.

Meanwhile, the second communication device 200 may also transmit an access permission command to the first communication device 100 instead of the certification information. In detail, if the certification information is requested by the first communication device 100 as in Step S211, the drive control module 220 of the second communication device 200 outputs a notification window to notify that the first communication device 100 is accessing the virtual drive, and then, if virtual drive access permission of the first communication device 100 is input by the user, the drive control module 220 may transmit the access permission command to the first communication device 100. If so, the activation processing module 120 of the first communication device 100 activates the virtual drive 110 by exposing a menu or icon accessible to the virtual drive 110 as the access permission command is received, and also transmits a list of files stored in the virtual drive 110 to the second communication device 200.

Figure 3:
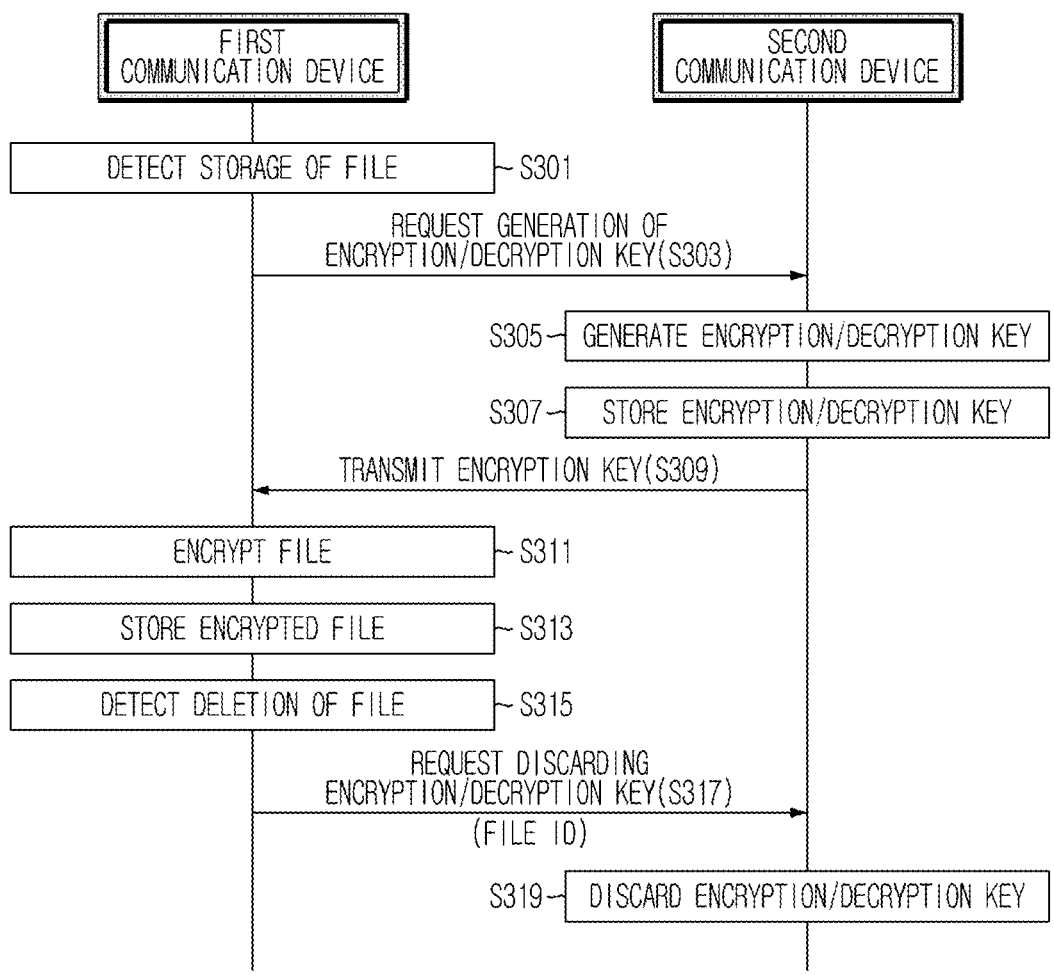
FIG. 3 is a flowchart for illustrating a method for generating and discarding an encryption/decryption key by the file security system according to an embodiment of the present disclosure.

FIG. 3 is a flowchart for illustrating a method for generating and discarding an encryption/decryption key by the file security system according to an embodiment of the present disclosure.

Referring to FIG. 3, if the virtual drive 110 is activate, the encryption module 130 of the first communication device 100 monitors whether contents of the virtual drive 110 are changed. Subsequently, if it is detected that a user attempts saving a new file in the virtual drive 110 (S301), the encryption module 130 requests the second communication device 200 to generate an encryption/decryption key for the new file (S303). At this time, the encryption module 130 generates identification information for the new file and transmits the generated file identification information to the second communication device 200.

If so, the key management module 230 of the second communication device 200 generates an encryption key and a decryption key for the new file according to an encryption/decryption key generation algorithm (S305). In other words, the key management module 230 generates 음 the new file-dedicated encryption and decryption keys. In addition, the key management module 230 may also output an input window for generating an encryption key and a decryption key on the screen of the second communication device 200 and generate an encryption key and a decryption key on the basis of information input through the input window.

Next, the key management module 230 maps the generated encryption and decryption keys with the file identification information and stores the keys in the key table of the storage module 210 (S307). Preferably, when an encryption key and a decryption key for a new file are generated, the key management module 230 transmits the generated encryption and decryption keys, the file identification information and user identification information (for example, service ID) of the second communication device 200 to the backup server 300, so that the key table stored in the storage module 210 is synchronized with the key table stored in the backup server 300.

If the key management module 230 generates an encryption key for a new file, the key providing module 240 transmits the encryption key generated by the key management module 230 to the first communication device 100 (S309).

If so, the encryption module 130 of the first communication device 100 encrypts a file newly stored in the virtual drive 110 by using the encryption key received from the second communication device 200 (S311). Next, the second communication device 200 stores the encrypted file in the virtual drive 100 (S313). Preferably, the encryption module 130 discards the encryption key received from the second communication device 200, so that the encryption key is stored only in the second communication device 200.

Meanwhile, the encryption module 130 may detect whether the user deletes a file at the virtual drive 110 (S315). In this case, the encryption module 130 checks identification information of at least one file deleted at the virtual drive 110 and transmits an encryption/decryption key discarding request message containing file identification information of each deleted file to the second communication device 200 (S317).

If so, the key management module 230 of the second communication device 200 extracts file identification information of at least one file from the encryption/decryption key discarding request message, and deletes the extracted file identification information of each file and the encryption and decryption keys mapped with the file identification information of each file from the key table of the storage module 210, so that the encryption and decryption keys for each file deleted from the virtual drive 110 are discarded (S319). Preferably, if the encryption key and the decryption key are deleted from the key table, the key management module 230 transmits the deleted encryption and decryption keys, the file identification information and the user identification information (for example, service ID) of the second communication device 200 to the backup server 300, so that the key table stored in the storage module 210 is synchronized with the key table stored in the backup server 300.

Figure 4:
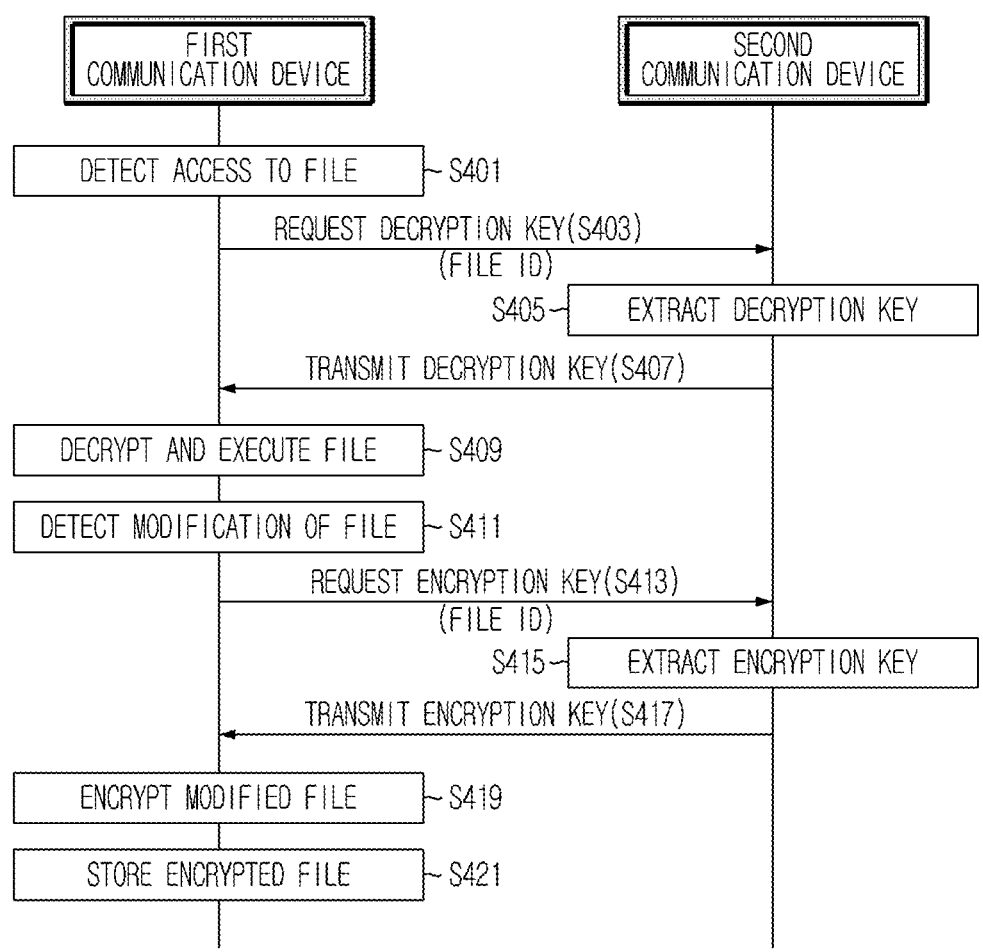
FIG. 4 is a flowchart for illustrating a method for encrypting and decrypting a file by the file security system according to an embodiment of the present disclosure.

FIG. 4 is a flowchart for illustrating a method for encrypting and decrypting a file by the file security system according to an embodiment of the present disclosure.

Referring to FIG. 4, if the activation processing module 120 of the first communication device 100 outputs information for at least one file stored in the virtual drive 110 on the screen, the decryption module 140 monitors whether the file stored in the virtual drive 110 is accessed.

Subsequently, if an access to any one of the files stored in the virtual drive 110 and exposed on the screen is detected (S401), the decryption module 140 checks file identification information of the access-detected file. Subsequently, the decryption module 140 transmits a decryption key request message containing the checked file identification information to the second communication device 200 (S403).

If so, the key providing module 240 of the second communication device 200 extracts the file identification information from the decryption key request message and extracts a decryption key mapped with the file identification information from the key table of the storage module 210 (S405). Subsequently, the key providing module 240 transmits the extracted decryption key to the first communication device 100 (S407).

Next, the decryption module 140 of the first communication device 100 decrypts the access-detected file by using the decryption key received from the second communication device 200 and executes the decrypted file (S409). Preferably, the decryption module 140 deletes the decryption key present in a storage area of the first communication device 100 after completing decryption of the file, so that the decryption key received from the second communication device 200 is discarded.

Subsequently, the encryption module 130 monitors whether the executed file is modified, and if it is detected that the file is modified, the encryption module 130 checks the file identification information of the file (S411). Next, the encryption module 130 transmits an encryption key request message containing the modification-detected file identification information to the second communication device 200 (S413).

If so, the key providing module 240 of the second communication device 200 extracts file identification information from the encryption key request message and extracts an encryption key mapped with the file identification information from the key table of the storage module 210 (S415). Subsequently, the key providing module 240 transmits the extracted encryption key to the first communication device 100 (S417).

Next, the encryption module 130 of the first communication device 100 encrypts the file modified by the user by using the encryption key received from the second communication device 200 (S419), and then replaces the unmodified file stored in the virtual drive 110 with the encrypted modified file and stores it (S421). In other words, if a file in the virtual drive 110 is modified by the user, the encryption module 130 receives an encryption key for encrypting the file from the second communication device 200, encrypts the modified file by using the encryption key, and stores the encrypted modified file in the virtual drive 110. Preferably, the encryption module 130 deletes the encryption key present in the storage area of the first communication device 100 after completing encryption of the file, so that the encryption key received from the second communication device 200 is discarded.

Figure 5:
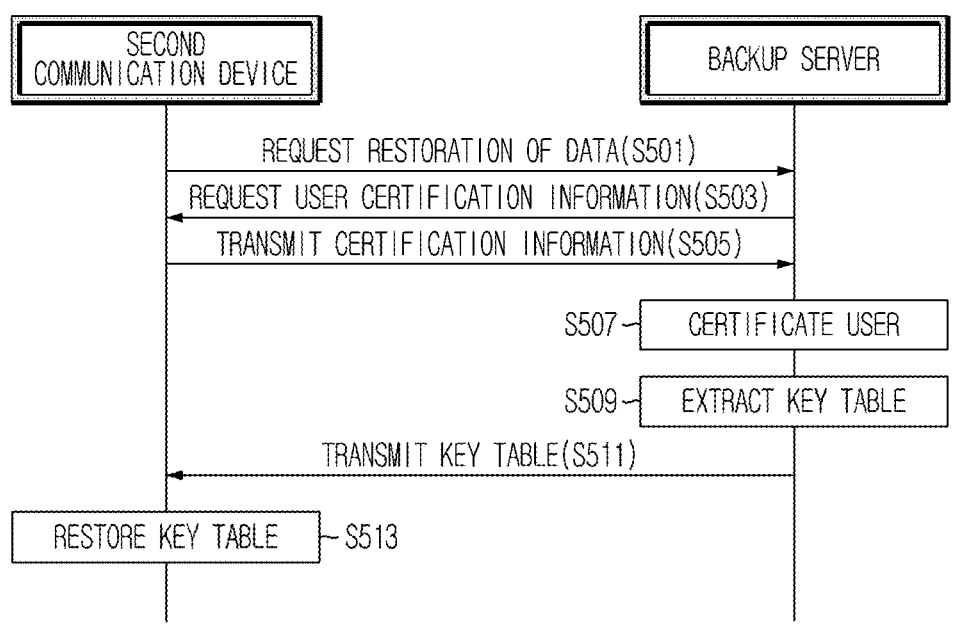
FIG. 5 is a flowchart for illustrating a method for restoring data of a second communication device by the file security system according to an embodiment of the present disclosure.

FIG. 5 is a flowchart for illustrating a method for restoring data of a second communication device by the file security system according to an embodiment of the present disclosure.

Referring to FIG. 5, the key management module 230 of the second communication device 200 transmits a data restoration request message containing user identification information (for example, service ID) to the backup server 300 (S501).

If so, the backup server 300 requests user certification information to the second communication device 200 (S503). At this time, the backup server 300 may transmit user certification information, for a webpage where a resident registration number, a name, a mobile phone number or the like is recorded, to the second communication device 200.

Next, the key management module 230 of the second communication device 200 receives user certification information input by the user and transmits the input user certification information to the backup server 300 (S505).

If so, the backup server 300 performs user certification on the basis of the received user certification information, and if the user certification is successful, the backup server 300 extracts a stored key table dedicated to the user (S507, S509). In other words, the backup server 300 extracts a key table which is mapped with user identification information of the second communication device and in which an encryption/decryption key for each file is recorded. Subsequently, the backup server 300 transmits the extracted user-dedicated key table to the second communication device 200 (S511).

Next, the key management module 230 of the second communication device 200 stores the key table received from the backup server 300 in the storage module 210, so that the user-dedicated key table is restored (S513).

According to the method of FIG. 5, if the user deletes or loses the key table or wants to copy the key table to another device, the user may access the backup server 300, performs user certification, and then restore the user-dedicated key table to a designated device.

Figure 6:
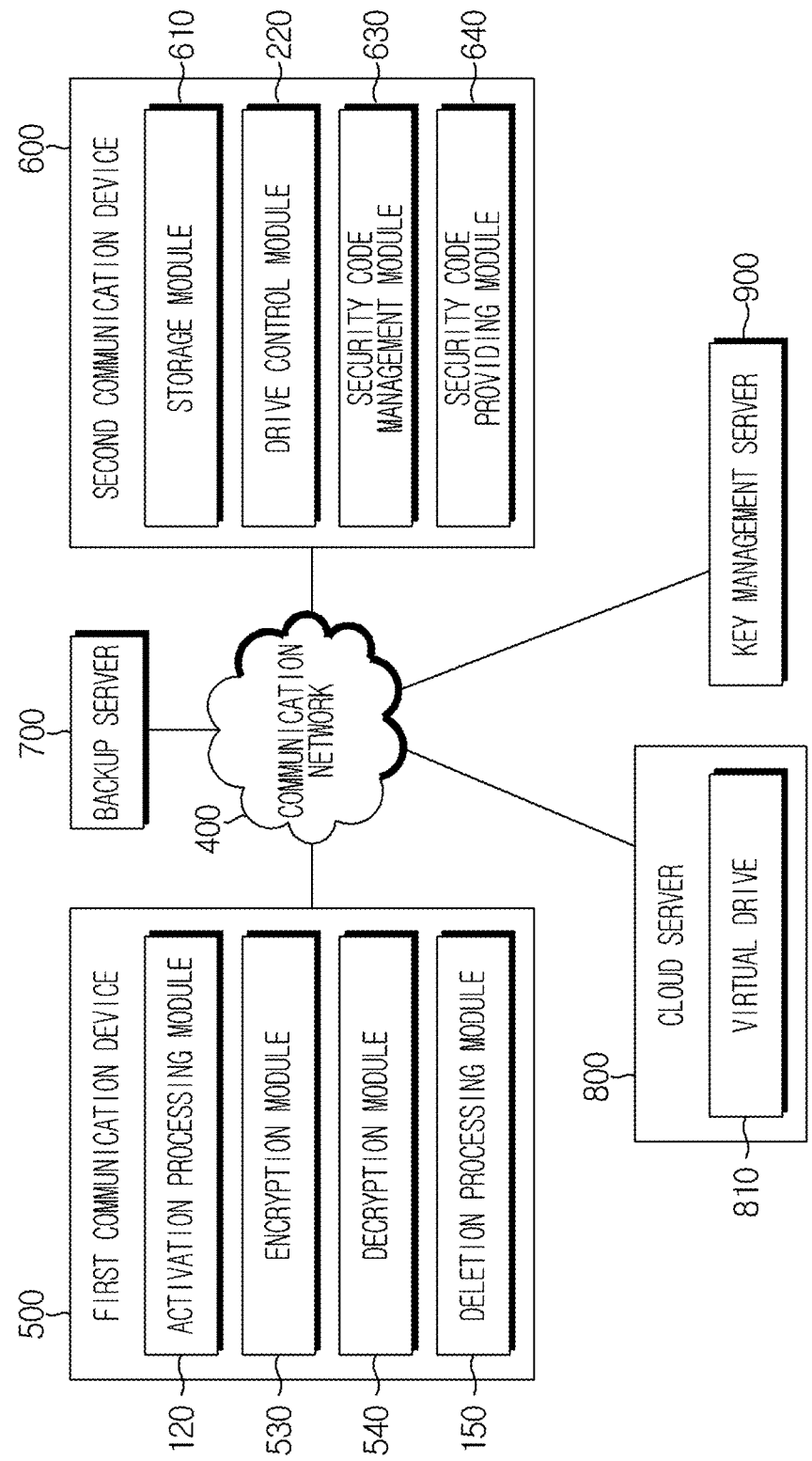
FIG. 6 is a diagram a file security system according to another embodiment of the present disclosure.

FIG. 6 is a diagram a file security system according to another embodiment of the present disclosure.

In the explanation with reference to FIG. 6, a component designated by the same reference numeral as in FIG. 1 is identical to that of FIG. 1 and thus is not described in detail here.

Referring to FIG. 6, a file security system according to another embodiment of the present disclosure includes a first communication device 500, a second communication device 600, a backup server 700, a cloud server 800 and a key storage server 900.

The backup server 700 separately stores a code table which is stored in the second communication device 600. In other words, the backup server 700 distinguishably stores a code table where file identification information is mapped with a security code, for each user. In addition, if data restoration is requested by the second communication device 600, the backup server 700 performs user certification of the second communication device 600, and then if the user certification is successful, the backup server 700 extracts the user-dedicated code table and transmits the code table to a designated communication device.

The cloud server 800 is a server for providing virtual drive service. The virtual drive service is also called web hard service, cloud service or the like. In particular, the cloud server 800 distinguishably stores a virtual drive 810 for storing an encrypted file, for each user. In other words, even though FIG. 1 depicts that the virtual drive is included in a local area of the first communication device 500, FIG. 6 depicts that the virtual drive 810 is included in the cloud server 800.

The key storage server 900 stores an encryption key for encrypting a file stored in the virtual drive 810 and a decryption key for decrypting a file stored in the virtual drive 810. The encryption key and the decryption key stored in the key storage server 900 are in an encrypted state. In particular, the key storage server 900 sets a storage address of each of the encrypted encryption and decryption keys and stores the encrypted encryption or decryption key in each set storage address.

The first communication device 500 is a communication device which is accessible to the virtual drive 810 of the cloud server 800 and obtains a decryption key or an encryption key in association with the second communication device 600 and the key storage server 900. In addition, the first communication device 500 encrypts a file by using the obtained encryption key and stores the encrypted file in the virtual drive 810 of the cloud server 800, and decrypts a file stored in the virtual drive 810 of the cloud server 800 by using the obtained decryption key.

The first communication device 500 includes an activation processing module 120, an encryption module 530, a decryption module 540 and a deletion processing module 150.

The activation processing module 120 determines whether or not to activate the virtual drive 810 included in the cloud server 800 and whether or not to display a file stored in the virtual drive 810.

The encryption module 530 encrypts a file which is stored in the virtual drive 810. In detail, when a new file is stored in the virtual drive 810 or a file stored in the virtual drive 810 is modified, the encryption module 530 receives a security code for the corresponding file from the second communication device 600 and obtains an encrypted encryption key where a hash value of the security code is set as a storage address from the key storage server 900. In addition, if the decryption module 540 decrypts the encrypted encryption key, the encryption module 530 encrypts the file by using the decrypted encryption key and then stores the encrypted file in the virtual drive 810. Meanwhile, if a new file is stored in the virtual drive 810 stored in the cloud server 800, the encryption module 530 requests the second communication device 600 to generate an encryption/decryption key for the file.

If the user accesses the encrypted file stored in the virtual drive 810, the decryption module 540 decrypts the encrypted file. In detail, if an access to the encrypted file stored in the virtual drive 810 is detected, the decryption module 540 receives a security code of the file from the second communication device 600 and obtains an encrypted decryption key where a hash value of the security code is set as a storage address from the key storage server 900. In addition, the decryption module 540 decrypts the encrypted decryption key by setting the security code as a decryption key, and decrypts and executes the access-detected file by using the decrypted decryption key. Meanwhile, if the encryption module 530 obtains the security code and the encrypted encryption key, the decryption module 540 decrypts the encrypted encryption key by setting the security code as a decryption key.

The second communication device 600 manages a security code, an encryption key and a decryption key required for encrypting or decrypting each file stored in the virtual drive 810 and provides a security code of a file requested by the first communication device 500 to the first communication device 500.

The second communication device 600 includes a storage module 610, a drive control module 220, a security code management module 630 and a security code providing module 640.

The storage module 610 stores a code table where file identification information is mapped with a security code.

The security code management module 630 generates an encryption key and a decryption key and stores the keys in the key storage server 900, and also generates a security code used for encrypting or decrypting the generated encryption and decryption keys and stores the security code in the code table of the storage module 610. In other words, if a request for generating an encryption/decryption key for a new file is requested by the first communication device 500, the security code management module 630 generates the new file-dedicated encryption and decryption keys and the security code, and sets the security code as an encryption key to encrypt the generated encryption and decryption keys. At this time, the security code management module 630 may generate the new file-dedicated encryption and decryption keys and the security code according to a predetermined algorithm, and may also receive an encryption key, a decryption key and a security code from the user and generate an encryption key, a decryption key and a security code on the basis of the input values.

In addition, the security code management module 630 calculates a hash value of the security code and requests the key storage server 900 to store the encryption/decryption key, so that the encrypted encryption and decryption keys are stored in a storage area of the key storage server 900 at which the hash value is set as a storage address. Moreover, the security code management module 630 maps the generated security code with file identification information and records it in the code table of the storage module 610. Preferably, the security code management module 630 discards the generated encryption and decryption keys, so that the encrypted encryption and decryption keys may be stored only in the key storage server 900.

Meanwhile, if an encryption/decryption key deletion request message containing file identification information is received from the first communication device 500, the security code management module 630 deletes the file identification information and the security code mapped with the file identification information from the code table of the storage module 610. Further, the security code management module 630 calculates a hash value of the deleted security code, and requests the key storage server 900 to delete the decryption key and the encryption key whose hash value is set as a storage address, so that the decryption key and the encryption key for the deleted file are deleted from the key storage server 900.

In addition, if a new security code is recorded in the code table of the storage module 610 or a security code recorded in the code table is deleted (namely, if the security table is updated), the security code management module 630 transmits a change item of the updated security table to the backup server 700, so that the security table of the storage module 610 is synchronized with the security table of the backup server 700. In addition, the security code management module 630 may also restore the security table by accessing the backup server 700, performing user certification, and then receiving the security table stored in the backup server 700.

The security code providing module 640 provides a security code to the first communication device 500. In detail, if a security code request message containing file identification information is received from the first communication device 500, the security code providing module 640 extracts a security code mapped with the file identification information from the code table of the storage module 610 and transmits the security code to the first communication device 500. In addition, if the security code management module 630 generates a security code for a new file and records the security code in the code table of the storage module 610, the security code providing module 640 transmits the security code for the new file to the first communication device 500.

Figure 7:
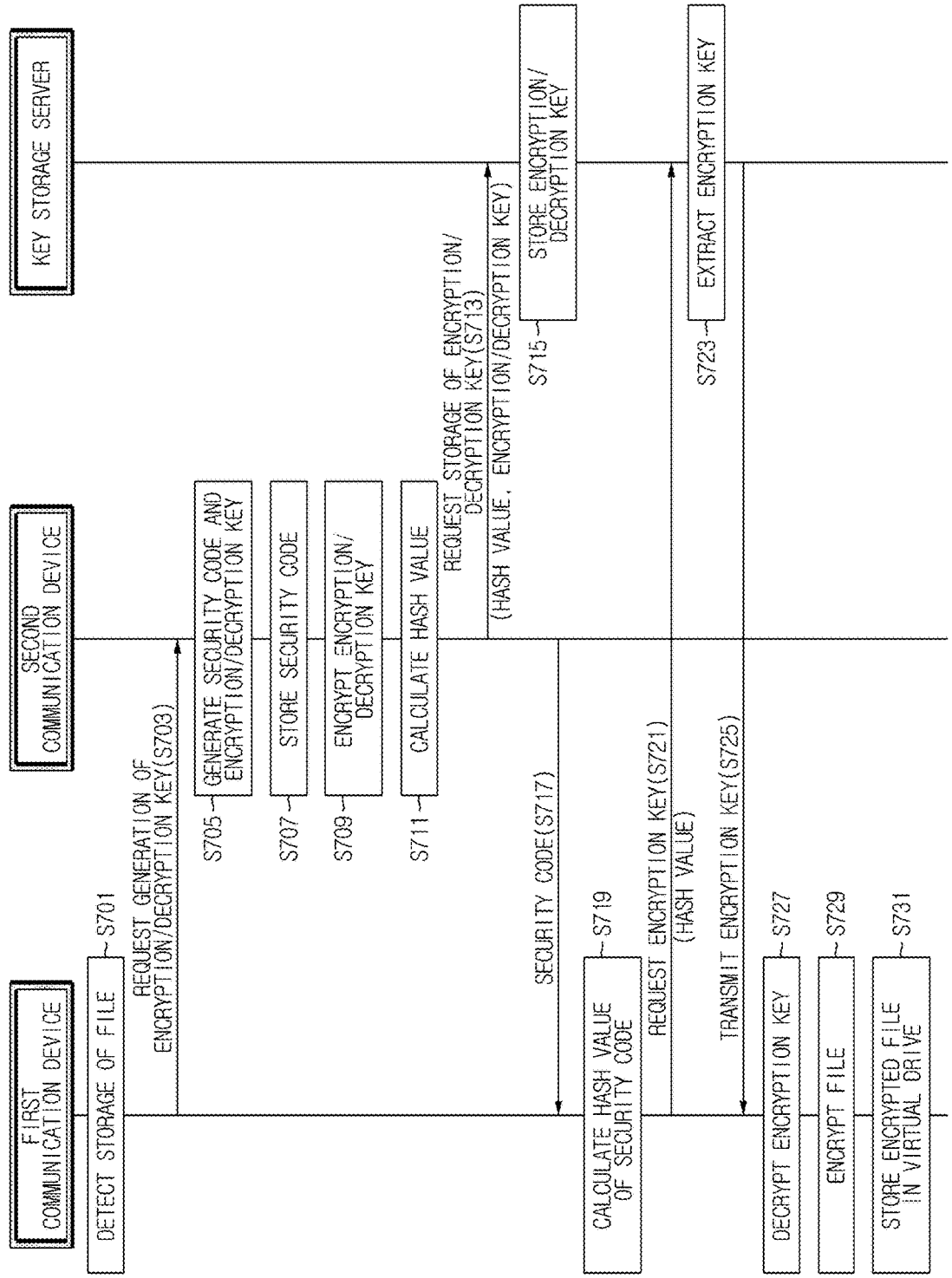
FIG. 7 is a flowchart for illustrating a method for generating an encryption/decryption key by the file security system according to another embodiment of the present disclosure.

FIG. 7 is a flowchart for illustrating a method for generating an encryption/decryption key by the file security system according to another embodiment of the present disclosure.

Referring to FIG. 7, if the virtual drive 810 is activated, the encryption module 530 of the first communication device 500 monitors whether a content of the virtual drive 810 is changed. Subsequently, if it is detected that the user attempts to saving a new file in the virtual drive 810, the encryption module 530 requests the second communication device 600 to generate an encryption/decryption key for the new file (S701, S703). At this time, the encryption module 530 generates file identification information for the new file and transmits the generated file identification information to the second communication device 600.

If so, the security code management module 630 of the second communication device 600 generates an encryption key and a decryption key for the new file according to an encryption/decryption key generation algorithm and also generates a security code used for encrypting the generated encryption and decryption keys according to a security code generation algorithm (S705). In other words, the second communication device 600 generates an encryption key, a decryption key and a security code, dedicated to the new file. Next, the security code management module 630 maps the generated security code with the file identification information and stores it in the code table of the storage module 610 (S707). Preferably, if a new security code is generated, the security code management module 630 transmits the generated security code, file identification information mapped with the security code and user identification information to the backup server 700, so that the security code stored in the storage module 610 is backed up to the backup server 700.

Subsequently, the security code management module 630 encrypts the generated encryption and decryption keys so as to be normally decrypted using the security code (S709). For example, the security code management module 630 sets the security code as an encryption key and performs symmetric key encryption/decryption for the generated encryption and decryption keys by using the security code set as an encryption key. In addition, the security code management module 630 calculates a hash value of the security code (S711), and transmits an encryption/decryption key storage request message containing the hash value and the encrypted encryption and decryption keys to the key storage server 900 (S713). If so, the key storage server 900 sets the hash value as a storage address and stores the encrypted encryption and decryption keys in the storage address (S715).

If the security code management module 630 transmits the encryption/decryption key storage request message to the key storage server 900, the security code providing module 640 transmits the generated security code to the first communication device 500 (S717). Preferably, the security code management module 630 discards the generated encryption and decryption keys, so that the decryption key and the encryption key for the new file are stored only in the key storage server 900.

Next, the encryption module 530 of the first communication device 500 calculates a hash value of the security code received from the second communication device 600 (S719), and transmits an encryption key request message containing the hash value to the key storage server 900 (S721).

If so, the key storage server 900 extracts an encryption key where the hash value is set as a storage address, from a plurality of stored encrypted encryption keys (S723), and transmits the extracted encryption key to the first communication device 500 (S725).

If so, the decryption module 540 sets the security code received from the second communication device 600 as a decryption key and decrypts the encrypted encryption key received from the key storage server 900 (S727). Next, the encryption module 530 encrypts a new file stored in the virtual drive 810 of the cloud server 800 by using the decrypted encryption key (S729), and then stores the encrypted file in the virtual drive 810 of the cloud server 800 (S731). Next, the encryption module 530 discards the encryption key, so that the encryption key for the file stored in the virtual drive 810 is removed from the storage area of the first communication device 500.

Figure 8:
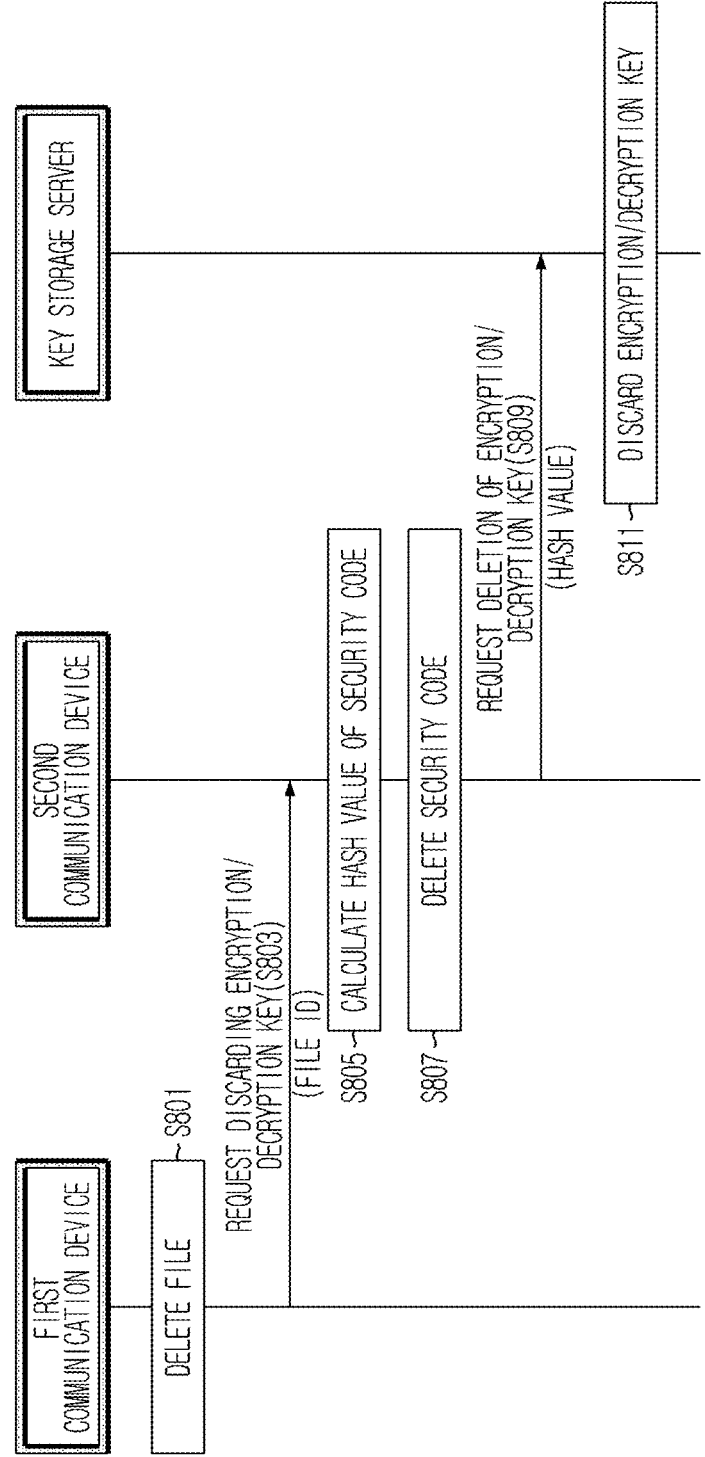
FIG. 8 is a flowchart for illustrating a method for discarding an encryption/decryption key by the file security system according to another embodiment of the present disclosure.

FIG. 8 is a flowchart for illustrating a method for discarding an encryption/decryption key by the file security system according to another embodiment of the present disclosure.

Referring to FIG. 8, the deletion processing module 150 detects whether the user deletes at least one file from the files stored in the virtual drive 810 of the cloud server 800 (S801). Subsequently, the deletion processing module 150 checks identification information for at least one file deleted from the virtual drive 810 and transmits an encryption/decryption key discarding request message containing the checked file identification information to the second communication device 600 (S803).

If so, the security code management module 630 of the second communication device 600 extracts file identification information of at least one file from the encryption/decryption key discarding request message, and extracts a security code mapped with the extracted file identification information of each file from the storage module 610.

Subsequently, the security code management module 630 calculates a hash value of each extracted security code (S805). In addition, the security code management module 630 deletes the file identification information of at least one file and the security code mapped with the file identification information from the storage module 610, so that the security code for each file deleted from the virtual drive 810 is discarded (S807). Next, the security code management module 630 transmits an encryption/decryption key deletion request message containing the calculated at least one hash value to the key storage server 900 (S809).

If so, the key storage server 900 checks each hash value at the encryption/decryption key deletion request message, and deletes the encrypted encryption and decryption keys of at least one file where each hash value is set as a storage address, so that the encryption key and the decryption key for each file deleted from the virtual drive 810 are discarded (S811).

Figure 9:
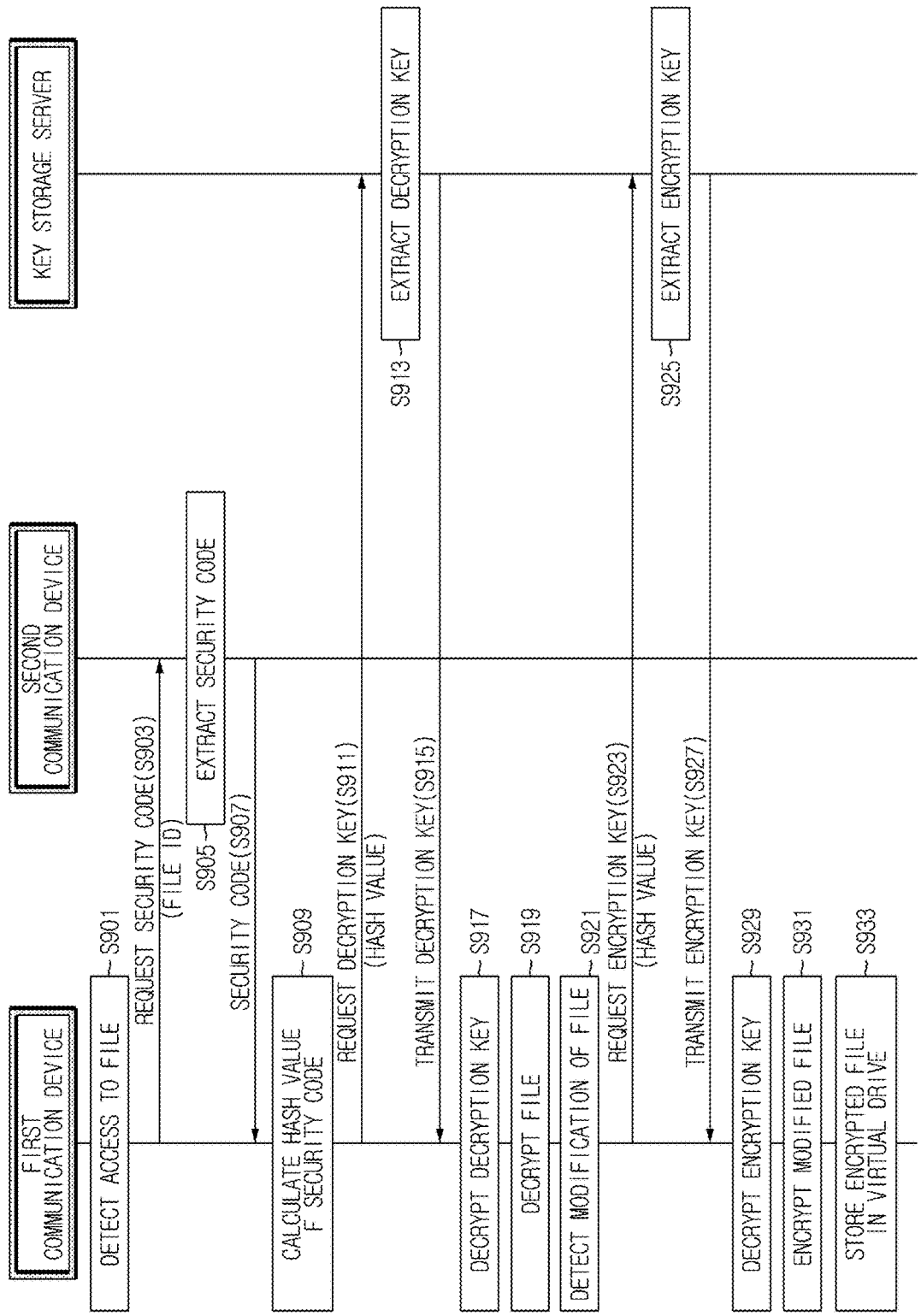
FIG. 9 is a flowchart for illustrating a method for encrypting and decrypting a file by the file security system according to another embodiment of the present disclosure.

FIG. 9 is a flowchart for illustrating a method for encrypting and decrypting a file by the file security system according to another embodiment of the present disclosure.

Referring to FIG. 9, if the activation processing module 120 of the first communication device 500 outputs information about at least one file stored in the virtual drive 810 on the screen, the decryption module 540 monitors whether an access to the file stored in the virtual drive 810 is detected.

Subsequently, if an access to the file stored in the virtual drive 810 is detected (S901), the decryption module 540 checks the access-detected file identification information. Subsequently, the decryption module 540 transmits a security code request message containing the checked file identification information to the second communication device 600 (S903).

If so, the security code providing module 640 of the second communication device 600 extracts file identification information from the security code request message, and extracts a security code mapped with the file identification information from the code table of the storage module 610 (S905). Subsequently, the security code providing module 640 transmits the extracted security code to the first communication device 500 (S907).

Next, the decryption module 540 of the first communication device 500 calculates a hash value of the security code received from the second communication device 600 (S909), and transmits a decryption key request message containing the hash value to the key storage server 900 (S911).

If so, the key storage server 900 extracts a decryption key where the hash value is set as a storage address, from a plurality of encrypted decryption keys (S913), and transmits the extracted encrypted decryption key to the first communication device 500 (S915).

If so, the decryption module 540 sets the security code received from the second communication device 600 as a decryption key, and decrypts the encrypted decryption key received from the key storage server 900 (S917). Next, the decryption module 540 decrypts the access-detected file by using the decrypted decryption key and executes the decrypted file (S919). Preferably, the decryption module 540 discards the decryption key received from the key storage server 900 after completing decryption of the file.

Subsequently, the encryption module 530 monitors whether it is detected that a file under execution is modified, and if a modification of the file is detected (S921), the encryption module 530 transmits an encryption key request message containing the hash value calculated in Step S909 to the key storage server 900 (S923).

If so, the key storage server 900 extracts an encryption key where the hash value is set as a storage address, from a plurality of encrypted encryption keys (S925), and transmits the extracted encrypted encryption key to the first communication device 500 (S927).

Next, the decryption module 540 of the first communication device 500 sets the security code received from the second communication device 600 as a decryption key, and decrypts the encrypted encryption key received from the key storage server 900 (S929). Next, the encryption module 530 encrypts the file modified by the user again by using the decrypted encryption key (S931), and then stores the encrypted modified file in the virtual drive 810 instead of the unmodified file (S933). In other words, if a file stored in the virtual drive 810 is modified by the user, the encryption module 530 receives an encrypted encryption key for the file from the second communication device 600, encrypts the file by using the encryption key, and stores the encrypted file in the virtual drive 810. Preferably, the encryption module 530 discards the encryption key received from the second communication device 600 after completing encryption of the file. More preferably, the decryption module 540 discards the security code of the file received from the second communication device 600 after the file is completely used (namely, if the file execution terminates).

As described above, in the present disclosure, important data of a user may be protected more safely against hacking since a file is encrypted and stored in association with a plurality of communication devices and an encrypted file is decrypted in association with a plurality of communication devices. In addition, in the present disclosure, since a file is not normally decrypted just with data stored in one device, even though data stored in a specific device is stolen, the file stored in a virtual drive cannot be decrypted by other persons, and thus the security of the file stored in the virtual drive may be reinforced.

While this specification contains many features, the features should not be construed as limitations on the scope of the disclosure or of the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multi-tasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A file security method for a file security system, the method comprising:
    by a first communication device, detecting an access to a file stored in a virtual drive;
    by the first communication device, requesting a security code of the file from a second communication device and receiving the security code;
    by the first communication device, receiving a decryption key of the file, at which a storage address is set, from a key storage server on the basis of the security code; and
    by the first communication device, decrypting the access-detected file by using the received decryption key,
    wherein the first communication device wirelessly communicates with the second communication device and allows a user of the second communication device to access the virtual drive on the first communication device when 1) the second communication device is located within a predetermined threshold distance from the first communication device and 2) the first and second communication devices are connected to the same wireless base station, and
    wherein, in response to determining that the second communication device is located outside the predetermined threshold distance from the first communication device and the first and second communication devices are not connected to the same wireless base station, processing, by the first communication device, to block the user of the second communication device from accessing the virtual drive on the first communication device.

2. The file security method according to claim 1, wherein said decrypting includes:
    by the first communication device, setting the security code as a decryption key and decrypting the decryption key; and
    by the first communication device, decrypting the access-detected file by using the decrypted decryption key.

3. The file security method according to claim 1, wherein said receiving includes:
    by the first communication device, calculating a hash value of the security code and receiving the decryption key, at which the hash value is set as a storage address, from the key storage server.

4. The file security method according to claim 1, further comprising:
    by the first communication device, detecting whether a file stored in the virtual drive is modified or a new file is stored in the virtual drive;

by the first communication device, requesting a security code of the modified file or the new file to the second communication device and receiving the security code, and receiving an encryption key, at which a hash value of the received security code is set as a storage address, from the key storage server; and by the first communication device, encrypting the modified file or the new file by using the received encryption key and storing the encrypted file in the virtual drive.

5. The file security method according to claim 4, wherein said encrypting and storing in the virtual drive includes:
by the first communication device, setting the security code of the modified file or the new file as a decryption key and decrypting the received encryption key; and
by the first communication device, encrypting the modified file or the new file by using the decrypted encryption key and storing the encrypted file in the virtual drive.

6. The file security method according to claim 1, further comprising:
by the first communication device, when it is detected that a new file is stored in the virtual drive, requesting the second communication device to generate a key for the new file;
by the second communication device, generating and storing a security code for the new file;
by the second communication device, generating an encryption key and a decryption key for the new file and encrypting the generated encryption and decryption keys by using the generated security code; and
by the second communication device, setting a storage address on the basis of the generated security code and storing the encrypted encryption and decryption keys in a storage area of the key storage server corresponding to the storage address.

7. The file security method according to claim 1, further comprising:
by the first communication device, deleting a file stored in the virtual drive;
by the first communication device, requesting the second communication device to discard a key for the deleted file;
by the second communication device, discarding a security code of the deleted file; and
by the second communication device, checking a storage address of an encryption key and a decryption key of the deleted file on the basis of the discarded security code and deleting the encryption key and the decryption key stored at the storage address from a storage area of the key storage server.

8. A communication device, comprising a first communication device which comprises:
a decryption module configured to:
when an access to a file stored in a virtual drive is detected, request a security code of the file from a second communication device and receive the security code,
receive a decryption key of the file whose storage address is set on the basis of the security code, and
decrypt the access-detected file by using the decryption key,
wherein the first communication device is configured to wirelessly communicate with the second communication device and allow a user of the second communication device to access the virtual drive on the first communication device when 1) the second communication device is located within a predetermined threshold distance from the first communication device and 2) the first and second communication devices are connected to the same wireless base station, and
wherein the first communication device is further configured to block the user of the second communication device from accessing the virtual drive on the first communication device in response to determining that the second communication device is located outside the predetermined threshold distance from the first communication device and the first and second communication devices are not connected to the same wireless base station.

9. The communication device according to claim 8, wherein the decryption module is configured to set the security code as a decryption key to decrypt the decryption key and is further configured to decrypt the access-detected file by using the decrypted decryption key.

10. The communication device according to claim 8, wherein the decryption module is configured to calculate a hash value of the security code and receive the decryption key at which the calculated hash value is set as a storage address, from a key storage server.

11. The communication device according to claim 8, wherein the first communication device further comprises:
an encryption module configured to:
when it is detected that a file stored in the virtual drive is modified or a new file is stored in the virtual drive, request a security code of the modified file or the new file from the second communication device and receive the security code,
receive an encryption key of the corresponding file, at which a storage address is set, from a key storage server on the basis of the security code, and
encrypt the modified file or the new file by using the received encryption key and store the encrypted file in the virtual drive.

12. The communication device according to claim 11, wherein the decryption module is configured to set the security code of the modified file or the new file as a decryption key and decrypt the encryption key, and
wherein the encryption module is configured to encrypt the modified file or the new file by using the decrypted encryption key.

13. The communication device according to claim 11, wherein when it is detected that a new file is stored in the virtual drive, the encryption module is configured to request the second communication device to generate a key for the new file and receive a security code for the new file from the second communication device.

14. The communication device according to claim 8, further comprising:
a deletion processing module configured to, when a file is deleted at the virtual drive, request the second communication device to discard a key for the deleted file.

15. A communication device, comprising a second communication device which comprises:
a storage module configured to store a security code for each file; and
a security code management module configured to:
receive a request for generating a key for a file stored in a virtual drive from a first communication device which is configured to access the virtual drive,
generate a security code for the file and store the generated security code in the storage module,
generate an encryption key and a decryption key for the file, and store the generated encryption and decryption keys in a storage area of a key storage server which is set on the basis of the security code wherein the second communication device is configured to wirelessly communicate with the first communication device configured to allow a user of the second communication device to access a virtual drive on the first communication device when 1) the second communication device is located within a predetermined threshold distance from the first communication device and 2) the first and second communication devices are connected to the same wireless base station, and wherein the second communication device is further configured to send a drive inactivation command to the first communication device to block the user of the second communication device from accessing the virtual drive on the first communication device in response to determining that the second communication device is located outside the predetermined threshold distance from the first communication device and the first and second communication devices are not connected to the same wireless base station.

16. The communication device according to claim 15, wherein the security code management module is configured to set the generated security code as an encryption key, encrypt the encryption key and the decryption key, and then store the encrypted encryption and decryption keys in the storage area of the key storage server.

17. The communication device according to claim 15, wherein the security code management module is configured to store the generated encryption and decryption keys in the storage area of the key storage server at which a hash value of the generated security code is set as a storage address.

18. The communication device according to claim 15, wherein the second communication device further comprises:

a security code providing module configured to extract a security code of a file, requested by the first communication device, from the storage module and transmit the security code to the first communication device.

19. The communication device according to claim 15, wherein the security code management module is configured to request a backup server to restore data, receive a security code of each file from the backup server, and restore a security code of each file stored in the storage module.

* * * * *